No. 677,297. Patented June 25, 1901.
E. F. WATSON.
ANIMAL CATCHER.
(Application filed Mar. 12, 1901.)
(No Model.)
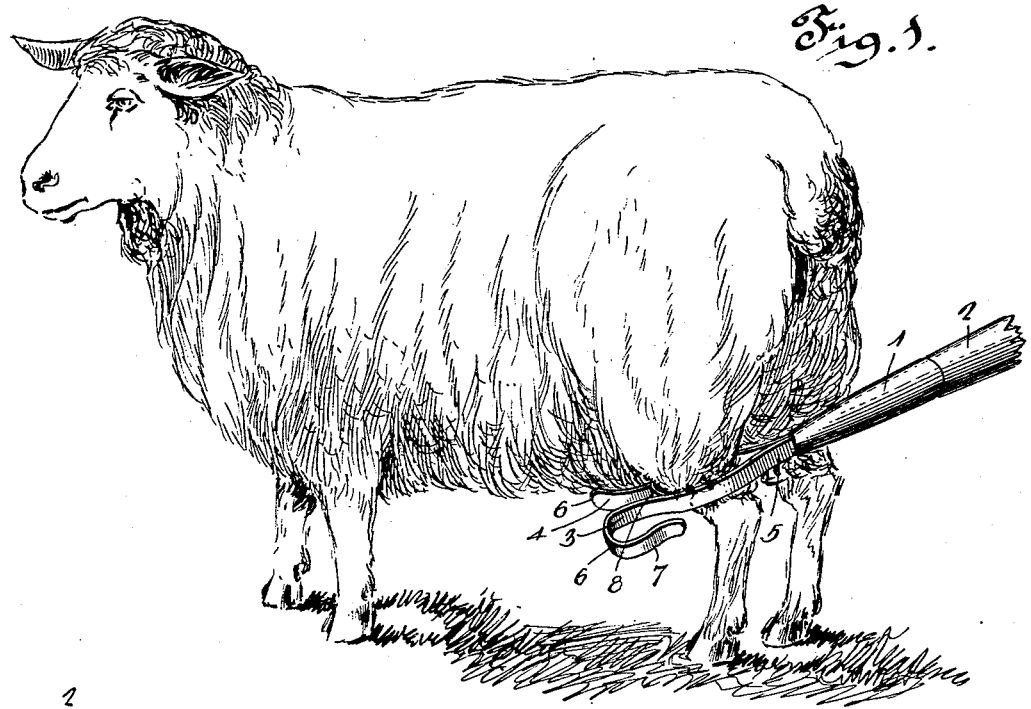
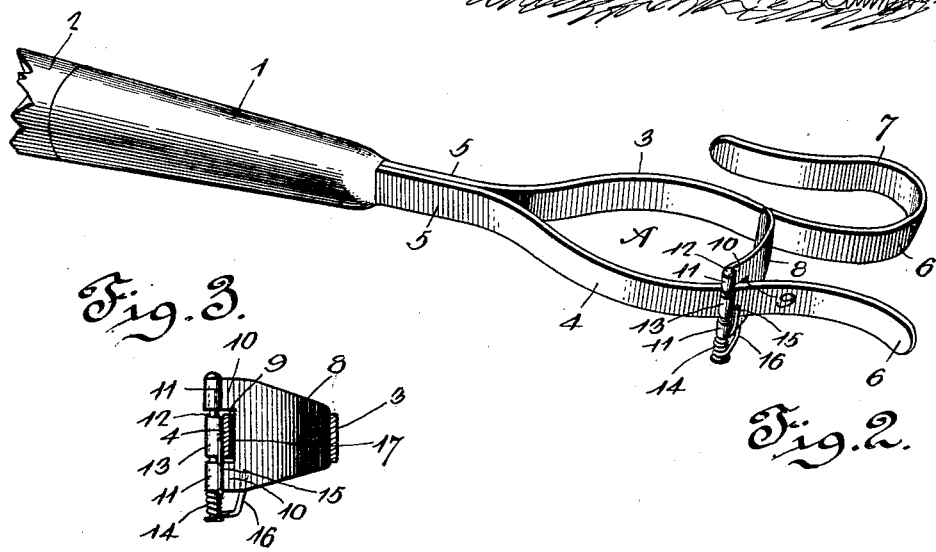
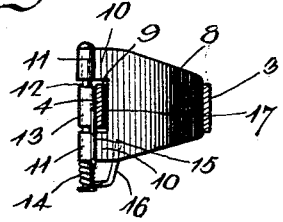
Witnesses
Frank Culverwell.
[signature]
E. F. Watson, Inventor.
By his Attorneys,
C. A. Snow & Co.

UNITED STATES PATENT OFFICE.

ELWIN F. WATSON, OF CASCADE, MONTANA.

ANIMAL-CATCHER.

SPECIFICATION forming part of Letters Patent No. 677,297, dated June 25, 1901.

Application filed March 12, 1901. Serial No. 50,859. (No model.)

*To all whom it may concern:*

Be it known that I, ELWIN F. WATSON, a citizen of the United States, residing at Cascade, in the county of Cascade and State of Montana, have invented a new and useful Animal-Catcher, of which the following is a specification.

This invention relates to animal-catchers, and particularly to shepherds' crooks, and has for its object to provide improved means for retaining the implement upon the leg of the animal and also to prevent the latter from kicking himself free from the implement.

To these ends the present invention consists in the combination and arrangement of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the drawings, Figure 1 is a perspective view of a sheep, showing the improved implement engaging one of the hind legs thereof. Fig. 2 is a detail perspective view of the operating portion of the implement. Fig. 3 is a detail transverse sectional view illustrating the manner of mounting the means for preventing accidental disengagement of the implement.

Corresponding parts in the several figures of the drawings are designated by like characters of reference.

Referring to the accompanying drawings, it will be seen that the present implement comprises a ferrule 1, having a suitable handle 2 fitted in the rear open end thereof, and opposite spring-jaws 3 and 4, respectively, which are fitted to the opposite end of the ferrule. Each of these jaws is provided at its inner end with a shank 5, and the two shanks are fitted flush against each other and connected to the forward end of the ferrule. Furthermore, each jaw is formed from a single length of flat spring metal, which is bowed outwardly from the shank, so as to provide a comparatively large loop A between the two jaws, and the outer free extremity 6 of each jaw is deflected outwardly, so as to provide a comparatively large and smooth entrance opening into the said loop. One of the jaws, as 3, is longer than the other and has its outer free end bent backward upon itself and upon the outer side thereof, so as to form a crook 7.

Located intermediate of the jaws and at the outer end of the loop formed therebetween is a yielding guard 8, which is best illustrated in Fig. 3 of the drawings. This guard is formed from a single sheet of metal bowed outwardly and provided at one end with a longitudinal slot 9, which loosely receives the short jaw 4. The ends of the arms 10, which are formed by the slot 9, are bent into transversely-alined eyes 11, which are located upon the outer side of the jaw 4 and receive a pivot-pin 12. Fixed to the outer side of the jaw 4 is another bearing-eye 13, which is alined intermediate of the eyes 11, so as to receive the pivot-pin 12, whereby the guard is fixed against longitudinal movement upon the jaw, but has a pivotal or hinged connection therewith. One end of the pin projects beyond the adjacent edge of the guard, and a spring 14 is coiled intermediate of its ends and about the projecting end of the pivot-pin. One end 15 of the spring engages against the outer face of the jaw 4 and is seated in the angle formed between the latter and the fixed bearing-eye 13 and upon the forward or outer side thereof, while the opposite end 16 engages against the rear face of the guard, so as to normally hold the free end of the latter in engagement with the opposite jaw 3, transversely between the two jaws and normally closing the entrance into the loop which is formed between the jaws.

In the operation of the device the sheep or other animal is approached from the rear and the opposite jaws 3 and 4 are engaged with one of the hind legs thereof, the spring-pressed guard 8 and also the jaws yielding sufficiently to permit of the leg passing the guard and into the loop in rear of the latter. The yielding guard will immediately resume its normal position after disengaging from the leg of the animal, and the inner or rear wall 17 of the slot 9 will engage against the inner face of the jaw 4, so as to positively hold the guard in its normal transverse position, thereby closing the opening between the jaws and preventing the animal from disengaging his leg from between the jaws. Thus it will be seen that the present implement may be automatically and effectively locked upon the leg of an animal by simply thrusting the jaws into engagement with the opposite sides of one of the legs of the animal. Also the crook 7 may be used in the ordinary manner for catching small lambs without changing or altering the implement.

What I claim is—

1. An animal-catcher, comprising opposite jaws, a bearing-eye fixed to the outer side of one of the jaws, a yielding shoulder formed from a bowed plate, having a longitudinal slot loosely embracing the latter jaw, and alined bearing-eyes located at opposite sides of the slot and embracing the eye on the jaw, a pivot-pin fitting in all of the eyes, and projecting beyond one edge of the shoulder, and a spring coiled about the projecting end of the pivot-pin, one end of the spring engaging against the outer side of the adjacent jaw, and the opposite end of the spring engaging against the rear concaved side of the shoulder, whereby the free end of the latter is normally maintained in engagement with the inner face of the opposite jaw, substantially as shown and described.

2. An animal-catcher, comprising longitudinally-disposed jaws at the forward end of the implement, the entrance between the jaws opening forwardly and longitudinally of the implement, and means for closing the entrance into the jaws to prevent displacement of the implement from an animal's leg.

3. An animal-catcher having a forked forward end, and a transverse guard extending between the members of the fork, and which is elastically yieldable to permit of entrance into the fork.

4. An animal-catcher having a forked forward end, and a transverse guard extending between the members, one end thereof having an elastically-yieldable hinged connection with the adjacent member, and yieldable in an inward direction only.

5. An animal-catcher, having a forked forward end, a bifurcated guard straddling one member of the fork, a pivot-pin connected at its intermediate portion to the outer side of the said fork member the guard being connected to the opposite ends of the pin, and a spring coiled about the pin with its opposite ends in engagement with the back of the guard and the adjacent fork member, the outer free end of the guard being elastically yieldable in an inward direction only, and the inner end of the bifurcated guard portion forming a stop-shoulder in normal engagement with the inner side of the adjacent fork member to limit the outward swing of the guard.

6. An animal-catcher, having a fork at the forward end thereof, one member of the fork having an outer terminal crook lying upon the outer side thereof, and a transverse guard extending between the fork members, one end of the guard having an elastically-yieldable hinged connection with one of the fork members, and the guard being yieldable in an inward direction only.

In testimony that I claim the foregoing as my own I have hereto affixed my signature in the presence of two witnesses.

E. F. WATSON.

Witnesses:
F. J. PATTERSON,
LENA A. BUNNELL.